US005827788A

United States Patent [19]

Miyakoshi

[11] Patent Number: 5,827,788

[45] Date of Patent: Oct. 27, 1998

[54] RECOATABLE DECORATIVE SHEET AND RECOATABLE DECORATIVE MATERIAL

[75] Inventor: Mitsutoyo Miyakoshi, Tokyo-To, Japan

[73] Assignee: Dai Nippon Printing Co., Ltd., Japan

[21] Appl. No.: 716,717

[22] Filed: Sep. 13, 1996

[30] Foreign Application Priority Data

| | | | |
|---|---|---|---|
| Sep. 20, 1995 | [JP] | Japan | 7-264618 |
| Jan. 22, 1996 | [JP] | Japan | 8-027254 |
| Jul. 26, 1996 | [JP] | Japan | 8-215407 |

[51] Int. Cl.$^6$ .............................. B32B 21/00; B32B 3/00

[52] U.S. Cl. .......................... 442/164; 442/381; 442/392; 428/542.2; 428/542.6

[58] Field of Search ............................. 428/542.2, 542.6, 428/224, 286, 287, 913.3; 442/381, 392, 352, 164

[56] References Cited

U.S. PATENT DOCUMENTS

| | | | |
|---|---|---|---|
| 4,018,957 | 4/1977 | Werner et al. | 428/332 X |
| 4,054,697 | 10/1977 | Reed et al. | 428/354 X |
| 4,379,193 | 4/1983 | Hunt | 428/326 X |
| 4,379,194 | 4/1983 | Clarke et al. | 428/326 X |
| 4,415,623 | 11/1983 | Schlaepfer | 428/914 X |
| 4,865,912 | 9/1989 | Mitsumoto | 428/461 X |
| 4,890,656 | 1/1990 | Ohsumi et al. | 144/350 |
| 5,296,340 | 3/1994 | Tsukada et al. | 430/394 |

OTHER PUBLICATIONS

Jap. Patent Laid Open 149457/1985 Abstract.

*Primary Examiner*—Daniel Zirker
*Attorney, Agent, or Firm*—Parkhurst & Wendel, L.L.P.

[57] ABSTRACT

A recoat layer 2 formed of a nonwoven fabric is laminated onto a pattern layer 4 provided on the surface of a substrate sheet 3 to constitute a recoatable decorative sheet 1, and the recoatable decorative sheet 1 is laminated onto a substrate for a decorative material, thereby constituting a recoatable decorative material. The above constitution can provide a recoatable material, which can form a surface having excellent build.

9 Claims, 5 Drawing Sheets

RECOATABLE DECORATIVE SHEET AND RECOATABLE DECORATIVE MATERIAL

BACKGROUND OF THE INVENTION

The present invention relates to a surface decorative sheet for furniture, interior materials for building, domestic electric appliances and the like. More particularly, the present invention relates to a decorative sheet which is recoatable, that is, can be later colored in its surface.

A decorative sheet comprising a substrate sheet having thereon a woodgrain pattern or the like has hitherto been laminated on the surface of high-grade furniture, interior materials for building, domestic electric appliances and the like for finishing purposes. The decorative sheet can be classified into a colored decorative sheet and an uncolored decorative sheet which is later colored. The latter is called a "recoatable decorative sheet."

The term "stain" used herein is a colorant, for coloring the surface of a wood, which is in the form of a liquid, a gel, a spray or the like comprising a linseed oil or a resin with a pigment or a dye added thereto. The stain is of aqueous or oil type and, in Japan, is called "Oiru Sutein (oil stain)," "Sutein Nisu (stain varnish)," "Suisei Sutein (aqueous stain)" or the like.

The recoatable decorative sheet is formed as a non-colored decorative sheet. After a product is assembled using a material with this decorative sheet laminated on the surface thereof, a paint, such as a stain, may be coated on the surface of the product to color the decorative sheet. Thus, any color can be easily put on the product. This method is advantageous in that the surface of the material is not scratched during assembling, preventing peeling of the coating, the workability is good, and the occurrence of defectives can be prevented. Further, a necessary color may be put on a pre-assembled product, depending upon demands, facilitating the control of goods in stock. Thus, the above method offers various advantages.

As disclosed, for example, in Japanese Patent Laid-Open No. 149457/1985, according to a conventional recoatable decorative sheet, a pattern is printed with a printing ink comprising a cellulosic resin as a component of the vehicle onto a printing substrate sheet comprising a cellulosic component as at least one component thereof, and a finishing paint comprising a polyol component, an isocyanate component, and a cellulosic component is coated on the pattern. The recoatable decorative sheet has high resistance to change with the elapse of time, excellent capability of the resin to prevent the permeation of a recoating paint, can offer good finishing, and has high adhesion to a recoating paint.

In the case of the conventional decorative sheet, that is, a decorative sheet with only a resin layer formed on the surface thereof, the adhesion to a recoating paint is good. Since, however, the surface is smooth, the recoating paint does not permeate into the surface resin layer and an attempt to form a thick coating of a stain or the like causes sagging, making it difficult to provide a surface having excellent build.

DISCLOSURE OF INVENTION

The present invention has been made with a view to solving the above drawback of the prior art, and an object of the present invention is to provide a recoatable decorative sheet and a recoatable decorative material, which can be thickly coated with a recoating paint, such as a stain, and can form a surface having excellent build.

The subject matter of the present invention resides in (1) a recoatable decorative sheet, comprising a recoat layer provided on a surface thereof, the recoat layer being formed of a nonwoven fabric; (2) the recoatable decorative sheet according to the above item (1), wherein the nonwoven fabric has a basis weight of 10 to 30 g/m$^2$; (3) the recoatable decorative sheet according to the above item (1) or (2), wherein the nonwoven fabric comprises a thermoplastic resin; (4) the recoatable decorative sheet according to any one of the above items (1) to (3), wherein the nonwoven fabric is formed of oriented fibers; (5) the recoatable decorative sheet according to the above item (4), wherein the nonwoven fabric comprises a laminate of a oriented nonwoven fabric and a nonoriented fabric; (6) the recoatable decorative sheet according to any one of the above items (1) to (5), wherein the nonwoven fabric has thereon a surface protective layer; (7) the recoatable decorative sheet according to the above item (6), wherein the surface protective layer has been formed using a two-component curing type resin; (8) the recoatable decorative sheet according to the above item (6), wherein the surface protective layer is formed of an ionizing radiation curing resin; (9) the recoatable decorative sheet according to any one of the above items (1) to (8), wherein a pattern layer is provided as a layer underlying the nonwoven fabric; (10) the recoatable decorative sheet according to the above item (9), wherein the direction of the pattern in the pattern layer has a correlation with the direction of the orientation of the fibers; (11) the recoatable decorative sheet according to the above item (10), wherein the pattern in the pattern layer is a woodgrain pattern and the direction of the wood grain pattern is identical to the direction of orientation of fibers constituting the nonwoven fabric; and (12) a recoatable decorative material, comprising: a substrate for a decorative material; and a recoatable decorative sheet according to any one of the above items (1) to (11), the decorative sheet being laminated on the substrate for a decorative material.

DETAILED DESCRIPTION OF INVENTION

Figure 1:
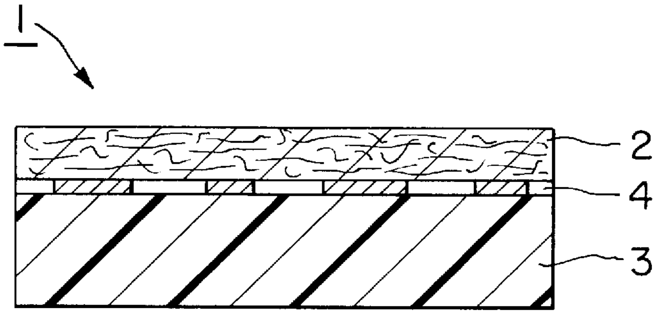
FIG. 1 is a longitudinal sectional view showing a first embodiment of the recoatable decorative sheet according to the present invention.

The present invention will be described with reference to the accompanying drawings. FIG. 1 is a longitudinal sectional view showing one embodiment of the recoatable decorative sheet according to the present invention. A decorative sheet 1 shown in FIG. 1 comprises a substrate sheet 3, a pattern layer 4 provided on the surface of the substrate sheet 3, and a recoat layer 2, formed of a nonwoven fabric, provided on the surface of the pattern layer 4. In the recoatable decorative sheet 1 according to the present invention, since the recoat layer located on the surface of the sheet is formed of a nonwoven fabric, a recoating paint, such as a stain, can be surely held in gaps in a nonwoven fabric, enabling the paint to be coated, without sagging from the surface of the decorative sheet, to form a coat having excellent build.

The nonwoven fabric used in the recoat layer 2 refers to a cloth produced by bringing synthetic, natural, glass or other fibers to a mat or thin cotton form by a suitable method and bonding the fibers to one another by an adhesive or fusing of the fibers per se. Nonwoven fabrics include wet nonwoven fabrics, dry nonwoven fabrics, and spun bonded nonwoven fabrics (direct type nonwoven fabrics). Nonwoven fabrics produced by any of the above processes may be used in the present invention. In all the above processes, the nonwoven fabric is prepared by preparing webs and bonding the webs to one another. In the case of the wet nonwoven fabric, the web is prepared in the same manner as that used in papermaking. On the other hand, in the dry process, the web may be prepared either by using a carding engine for spinning or by spraying fibers on a wire gauge being rotated by taking advantage of an air stream. The former method provides a nonwoven fabric wherein fibers are arranged in only one direction (an oriented nonwoven fabric), while the latter method provides a nonwoven fabric wherein the direction of the arrangement of the fibers is not limited (a non-oriented nonwoven fabric). Short fibers are used in the dry nonwoven fabric and the wet nonwoven fabric. On the other hand, melt spinning is used in the spun bonded nonwoven fabric. In the spun bonded nonwoven fabric, a thermoplastic resin is used, and a web in a sheet form is prepared simultaneously with spinning of fibers. As soon as the thermoplastic resin is melt-spun, it is carried by means of a high-speed gas stream of air or other gases and deposited onto a conveyor or a screw drum to form a sheet. Other examples of the method for preparing a nonwoven fabric include one wherein a plastic film is split into a network split web. Bonding of fibers to one another in the preparation of a nonwoven fabric may be performed by adhesive bonding, solvent bonding, bonding among fibers, mechanical bonding or the like. Examples of adhesive bonding methods include a method wherein a vinyl chloride emulsion, a vinyl acetate emulsion, acrylic ester emulsion, or an emulsion of copolymer thereof is mainly sprayed on the web, a method wherein the web is immersed in the above emulsion, and a method wherein the above emulsion is brought to a foam form and forced into the web. The solvent bonding is utilized in the spun bonded nonwoven fabric. The bonding among fibers is achieved by simultaneous spinning of fibers having a low melting point at the time of spinning to prepare a web which is then bonded by means of a hot roll. The mechanical bonding is performed using a needle punch.

The fibers used in the nonwoven fabric, in the case of short fibers, may be either at least one member of natural fibers, such as cotton, synthetic fibers, such as rayon, acetate, nylon, vinylon, polyesters, polyolefin, acrylic fibers, and glass fibers, or a blend of at least two members of the above fibers. Fibers of polyester, nylon, polyolefins, such as polypropylene and polyethylene, polyvinyl chloride and the like may be used for melt spinning in the spun bonding, while cellulosic rayon may be used for the wet process.

In the case of an acrylic, rayon, nylon, polyolefin or other fiber, the nonwoven fabric made of such fiber may be thermowelded and laminated onto the substrate sheet. On the other hand, a nonwoven fabric made of a blend of an acrylic fiber with a polyester fiber can successfully prevent fuzzing at the time of coating of a stain on a recoat layer in the decorative sheet, resulting in excellent surface appearance of the decorative sheet after coating of the recoating paint.

The thickness of the recoat layer 2 may be preferably such that, when a pattern layer 4 is provided on the underside of the recoat layer 2, the pattern layer 4 can be clearly viewed through the recoat layer 2 from the top surface side of the decorative sheet 1. Specifically, the basis weight of the nonwoven fabric is preferably in the range of from 10 to 30 $g/m^2$. The fibers for constituting the nonwoven fabric are preferably thermoweldable because, in the preparation of the decorative sheet, the nonwoven fabric can be laminated onto the substrate sheet without purposely using any adhesive, so that the production of the decorative sheet is advantageously easy and cost-effective. When the basis weight of the nonwoven fabric is less than 10 $g/m^2$, there is a possibility that a colorant cannot be coated so as to form a coating having good build, leading to a fear of the durability of the surface of the decorative sheet after coating being unsatisfactory. On the other hand, when the basis weight of the nonwoven fabric exceeds 30 $g/m^2$, coating of a colorant, such as a stain, provides an excessively large coverage of the colorant and, hence, deteriorates the transparency of the surface of the sheet, leading to a fear of the visibility of the pattern being deteriorated.

The substrate sheet 3 may be any one commonly used as a substrate sheet in this type of decorative sheet. Specific examples thereof include sheets of conventional plastics, for example, polyolefins such as polyethylene, polypropylene, vinyl chloride/vinyl acetate copolymer, ethylene/acrylic acid copolymer, and ethylene/acrylic ester copolymer; vinyl resins such as polyvinyl chloride, saponification product of ethylene/vinyl acetate copolymer; polyesters such as polyethylene terephthalate and polybutylene terephthalate; acrylic resins such as polymethyl methacrylate, polyethyl acrylate, and polyethyl methacrylate; polystyrene; and cellulose triacetate. It may have either a single layer structure of the above sheet or a laminate of a combination of various sheets as described above. Further, foils of metals, such as aluminum, copper, and iron may also be used alone or as a laminate sheet of the metal foil and the plastic sheet. The substrate sheet 3 has a thickness in the range of from 80 to 150 $\mu$m. The substrate sheet is preferably a polyvinyl chloride sheet containing a plasticizer on a loading level of 17 to 25 PHR. The plasticizer for the polyvinyl chloride sheet is preferably a trimellitic acid plasticizer from the viewpoint of imparting durability. In this case, a decorative sheet having excellent weather resistance and heat resistance can be provided.

The pattern of the pattern layer 4 may be suitably selected from replicas of natural products, such as woodgrain, marble grain, cloth and other patterns, and figures, symbols, letters, ruled lines, and solid according to applications of the decorative sheet. The pattern layer 4 may be formed by conventional printing methods using a letterpress, an intaglio printing, and a stencil, such as gravure printing, flexography, and silk screen printing, ink jet printing and other methods. The binder for a printing ink used in the above printing may be suitably selected according to the substrate sheet applied. Binders, for the ink, usable herein include cellulose derivatives, such as ethyl cellulose, nitrocellulose, and cellulose acetate butyrate, acrylic resins, such as polymethyl methacrylate and polybutyl methacrylate, and vinyl resins, such as polyvinyl chloride, vinyl chloride/vinyl acetate copolymer, and polyvinyl butyral. The printing ink may be prepared by diluting the above binder with a desired solvent according to the printability and adding a desired light-resistant pigment and other necessary additives to the vehicle. When a polyvinyl chloride sheet is used as the substrate sheet 3, a vinyl chloride/vinyl acetate copolymer, an acrylic resin or the like is preferably used as the binder for the ink.

Figure 2:
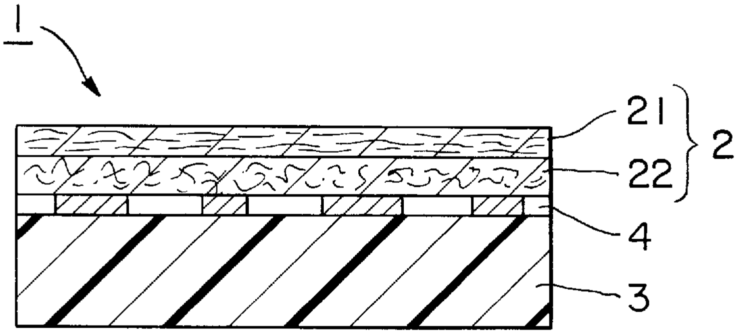
FIG. 2 is a longitudinal sectional view showing a second embodiment of the recoatable decorative sheet according to the present invention.

FIG. 2 is a longitudinal sectional view showing a second embodiment of the recoatable decorative sheet according to the present invention. As shown in FIG. 2, according to the recoatable decorative sheet 1 of the present invention, a laminate of an oriented nonwoven fabric 21 comprising fibers arranged in a certain direction and a non-oriented nonwoven fabric 22 comprising fibers having no directional property of the arrangement thereof may be also used as a recoat layer 2. The oriented nonwoven fabric 21, when used as a surface layer of the recoatable decorative sheet, has the effect of preventing fuzzing at the time of brush coating of a stain, or fuzzing at the time of lapping. On the other hand, the non-oriented nonwoven fabric 22 is resistant to tearing by virtue of random arrangement of fibers. Therefore, the lamination of the oriented nonwoven fabric 21 and the non-oriented nonwoven fabric 22 results in improved strength of the whole decorated sheet as compared with the use of the oriented nonwoven fabric 21 alone.

In the nonwoven fabric comprising a laminate of an oriented nonwoven fabric 21 and a non-oriented nonwoven fabric 22, any of the oriented nonwoven fabric and the non-oriented nonwoven fabric may be provided on the top surface side. Since, however, the oriented nonwoven fabric is superior in the effect of preventing fuzzing, as shown in FIG. 2, preferably, the oriented nonwoven fabric 21 is provided on the external surface side.

The laminated nonwoven fabric is not limited to the above laminate of an oriented nonwoven fabric and a non-oriented nonwoven fabric, and a laminate of oriented nonwoven fabrics laminated so as for the direction of orientation in one of the nonwoven fabrics to intersect the direction of orientation in the other nonwoven fabric may be also used. Such lamination can improve the resistance to tearing in the direction of orientation.

Figure 7:
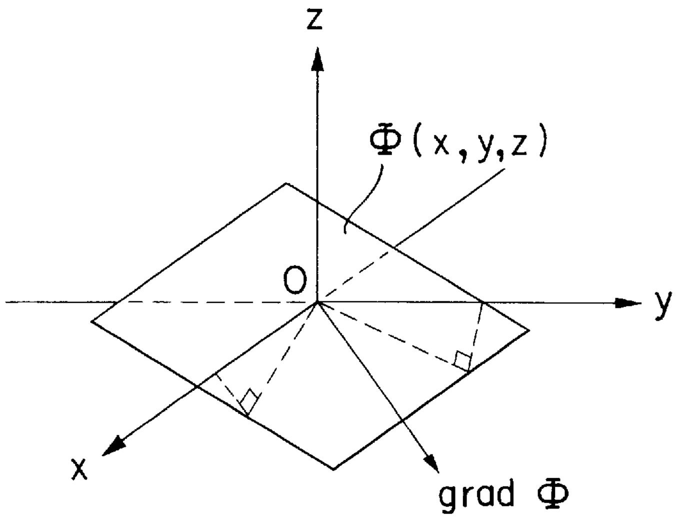
FIG. 7 is an explanatory view of an orthogonal coordinate system for specifying the direction of orientation of fibers constituting a nonwoven fabric.

In the present invention, the orientation of the oriented nonwoven fabric or the non-oriented nonwoven fabric may be defined as the direction of inclination of fibers in the longitudinal direction within a three-dimensional space. Specifically, as shown in FIG. 7, an orthogonal coordinate system (x, y, z) is taken so as for a plane parallel to the surface of a recoat layer as a reference to be an xy plane, and the equation of the fibers is expressed by $\Phi$ (x, y, z). The orientation is defined by the gradient vector (grad$\Phi$) of the fibers:

$$\mathrm{grad}\Phi=(\partial\Phi/\partial x,\ \partial\Phi/\partial y,\ \partial\Phi/\partial z)$$

Figure 8:
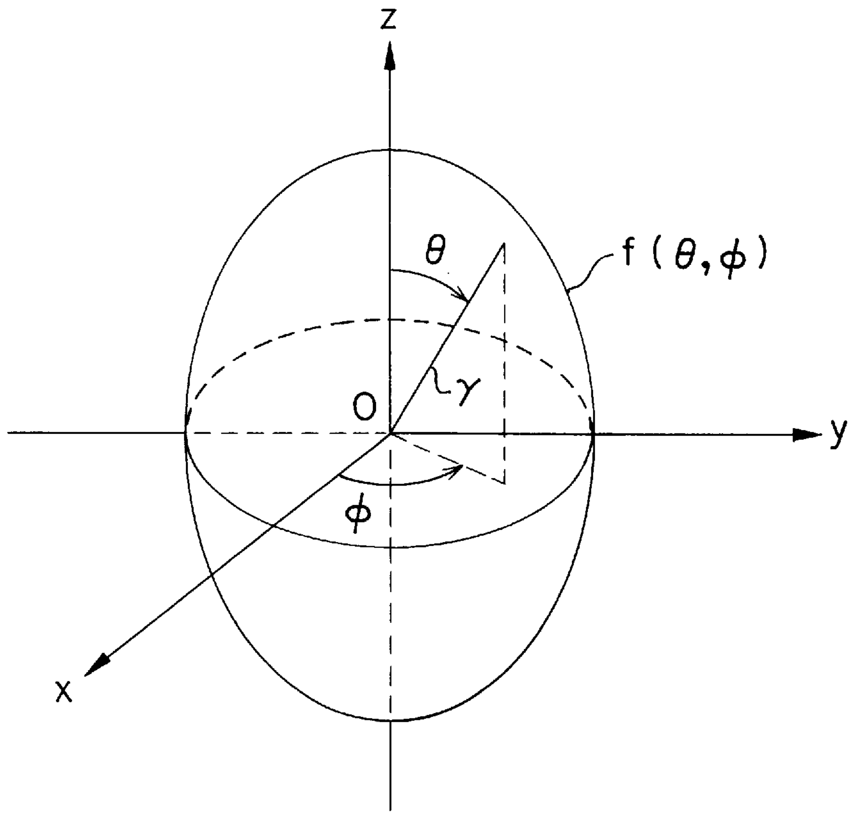
FIG. 8 is an explanatory view of a polar coordinate of the coordinate system shown in FIG. 7.
Figure 9:
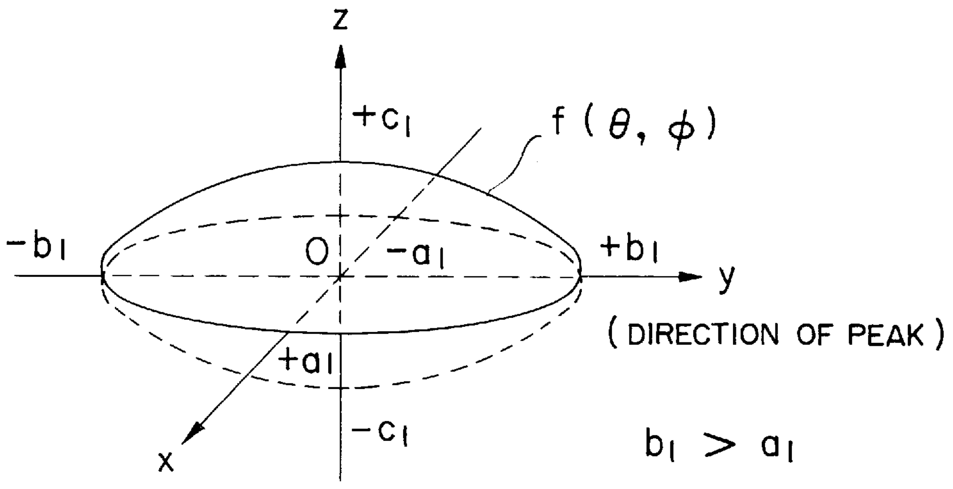
FIG. 9 is a diagram showing one embodiment of a surface represented by plotting an orientation distribution of oriented fibers constituting a nonwoven fabric on an orthogonal coordinate.
Figure 10:
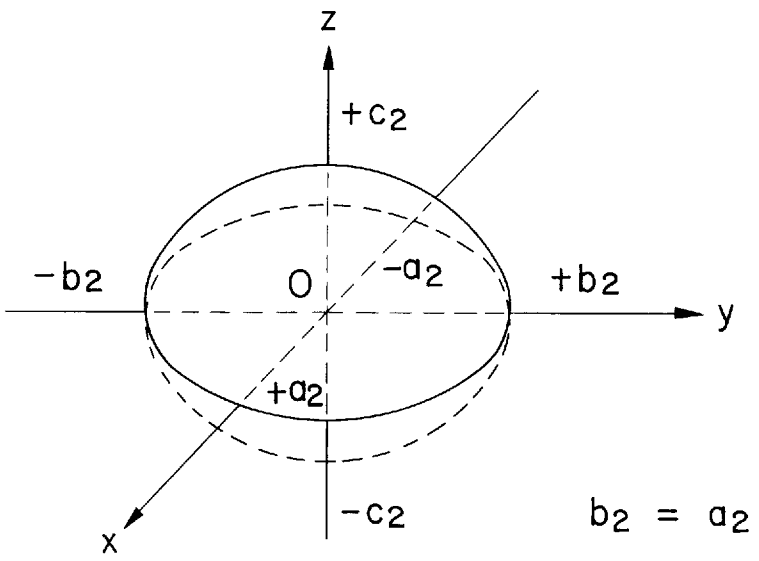
FIG. 10 is a diagram showing one embodiment of a surface represented by plotting an orientation distribution of non-oriented fibers constituting a nonwoven fabric on a polar coordinate.

The direction in which, when water is poured into fibers in a gravity field, water flows down is the direction of grad$\Phi$ vector. Since the direction of orientation of fibers varies depending on individual fiber pieces, the fiber pieces in the nonwoven fabric have a distribution with respect to the azimuth ($\theta$, $\phi$) in the three-dimensional space. Therefore, the orientation of fibers in the nonwoven fabric is expressed by probability density function f($\theta/\phi$) of grad$\Phi$ in the direction of orientation of individual fibers within the three-dimensional space. In this case, f($\theta/\phi$) is a polar coordinate (a spherical coordinate). The relationship between the orthogonal coordinate and the polar coordinate is as shown in FIGS. 7 and 8. FIGS. 9 and 10 are obtained by applying $\gamma$ coordinate of three-dimensional polar coordinate ($\gamma$, $\theta$, $\phi$) to the probability density distribution in the direction of the azimuth ($\theta$, $\phi$) and plotting a surface of f($\theta$, $\phi$) on the original orthogonal coordinate (the xy plane being parallel to the surface of the recoat layer). The distribution of the direction of orientation of fibers can be grasped by the form of the surface f($\theta$, $\phi$).

FIG. 9 shows the distribution orientation of the oriented nonwoven fabric 21 in the decorative sheet shown in FIG. 2, and the peak in the direction of orientation of the fibers is in the y direction. In general, the probability distribution of fibers constituting the oriented nonwoven fabric has no large peak in the direction of z axis. As shown in FIG. 9, a peak is present in the direction of xy plane. In this connection, it should be noted that f($\theta$, $\phi$) in FIG. 9 is a schematic diagram of a representative example, and, in the present invention, the oriented nonwoven fabric is not necessarily in an ellipsoid of evolution. In any event, the presence of a peak of the probability distribution in any place in the direction of xy plane suffices for the present invention.

FIG. 10 shows the distribution of orientation of randomly arranged fibers constituting the non-oriented nonwoven fabric 22 in the decorative sheet shown in FIG. 2. In this case, the fibers are substantially uniformly distributed in the direction of xy plane. In the non-oriented nonwoven fabric, the section for the surface f($\theta$, $\phi$) representing the probability density function is not necessarily required to be in a complete circle form.

Figure 3:
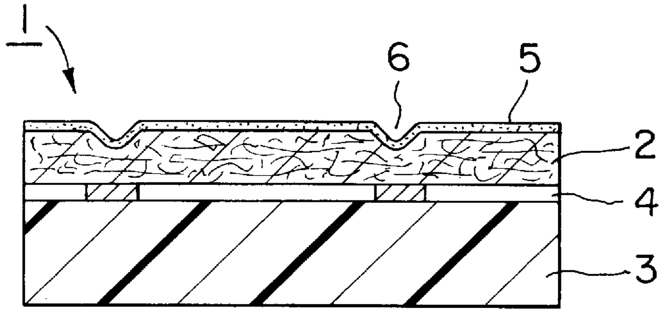
FIG. 3 is a longitudinal sectional view showing a third embodiment of the recoatable decorative sheet according to the present invention.

FIG. 3 is a longitudinal sectional view of a third embodiment of the recoatable decorative sheet according to the present invention. As shown in FIG. 3, in the recoatable decorative sheet 1 according to the present invention, a surface protective layer 5 may be provided on the surface of the nonwoven fabric constituting the recoat layer 2. The surface protective layer 5 may be formed by coating a transparent (non-colored) resin coating composition on the surface of the nonwoven fabric. The provision of the surface protective layer 5 can protect the surface of the nonwoven fabric constituting the recoat layer 2, can satisfactorily prevent fuzzing in the surface of the decorative sheet at the time of coating and, in addition, can improve the resistance to friction created at the time of application of the decorative sheet to a substrate for a decorative material or the like and the resistance of a product to friction during use for a long period of time. In order that a recoating paint can fully permeate the nonwoven fabric, the surface protective layer 5 is coated so as not to cover the whole surface of the nonwoven fabric. In FIG. 3, the surface resin layer 5 is shown so as to cover the whole surface of the recoat layer 2 for explanation purposes. In fact, however, as shown in FIG. 4, gaps **2*b* exist between fibers 2*a* in the surface of the nonwoven fabric, and the resin constituting the surface protective layer is deposited in only a portion where fibers come into contact with each other or a portion where the distance between fibers is short, while satisfactorily ensuring the gaps 2*b***.

Figure 4:
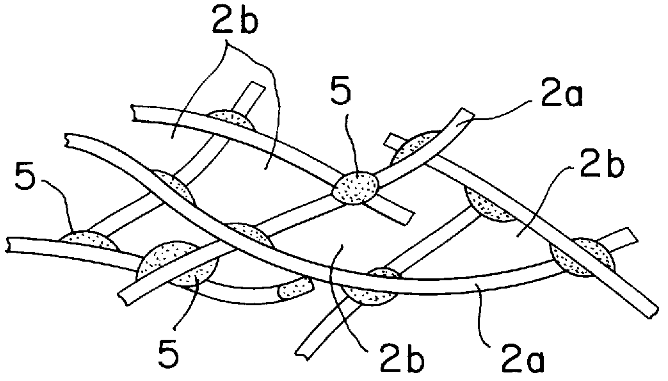
FIG. 4 is a conceptual view showing a surface protective layer provided on the surface of a nonwoven fabric.

The coverage of the surface protective layer 5 as shown in FIG. 4 can offer satisfactory effect of preventing fuzzing and improving the abrasion resistance. Regarding specific coverage of the surface protective layer 5, for example, in the case of a nonwoven fabric having a basis weight of 10 to 30 g/m$^2$, the coverage is preferably in the range of from 2 to 10 g/m$^2$. When the resin constituting the surface protective layer 5 is a thermoplastic resin or a thermosetting resin, the coverage is particularly preferably in the range of from 2 to 5 g/m$^2$, while when the resin is an ionizing radiation curing resin, the coverage is particularly preferably 5 to 10 g/m$^2$. When the coverage of the surface protective layer 5 is excessively small, the effect of improving the abrasion resistance is small, while when it is excessively large, the surface protective layer 5 completely covers the gaps 2*b* and inhibits the permeation of a colorant, such as a stain, into the nonwoven fabric, rendering subsequent coloring with the colorant unsatisfactory.

The resin for constituting the surface protective layer 5 may be a thermoplastic resin, a thermosetting resin, an ionizing radiation curing resin or the like. Examples of thermoplastic resins usable herein include natural or synthetic resins, for example, cellulose derivatives, such as ethyl cellulose, cellulose nitrate, cellulose acetate, ethyl hydroxy ethyl cellulose, cellulose acetate propionate, styrene resins or styrene copolymers, such as polystyrene, poly-α-methyl styrene, acrylic resins, such as polymethyl methacrylate, polyethyl methacrylate, polyethyl acrylate and polybutyl acrylate, vinyl polymers, such as polyvinyl chloride, polyvinyl acetate, vinyl chloride/vinyl acetate copolymer, and polyvinyl butyral, rosins and rosin ester resins, such as rosin-modified maleic acid resin, rosin-modified phenolic resin, and polymerized rosins, coumarone resins, vinyltoluene resins, and polyamide resins. Examples of thermosetting resins usable herein include phenolic resin, urea resin, diallyl phthalate resin, melamine resin, guanamine resin, unsaturated polyester resin, polyurethane resin, epoxy resin, aminoalkyd resin, melamine-urea co-condensed resin, silicone resin, and polysiloxane resin. If necessary, curing agents, such as crosslinking agents and polymerization initiators, polymerization accelerators, solvents, viscosity modifiers, extender pigments and the like may be added to the resin to prepare a coating composition.

A composition comprising a suitable mixture of a prepolymer, an oligomer and/or a monomer having a polymerizable unsaturated bond in its molecule for an epoxy group may be used as the ionizing radiation curing resin.

Examples of the prepolymer and oligomer include unsaturated polyesters, such as a condensate of an unsaturated dicarboxylic acid with a polyhydric alcohol, methacrylates, such as polyester methacrylate, polyether methacrylate, polyol methacrylate, and melamine methacrylate, and acrylates, such as polyester acrylate, epoxy acrylate, urethane acrylate, polyether acrylate, polyol acrylate, and melamine acrylate.

Examples of the monomer include styrene monomers, such as styrene, α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated acids, such as 2-(N,N-diethylamino)ethyl acrylate, 2-(N,N-dimethylamino)ethyl methacrylate, 2-(N,N-dibenzylamino) ethyl acrylate, (N,N-dimethylamino)methyl methacrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, diethylene glycol diacrylate, and triethylene glycol diacrylate, polyfunctional compounds, such as dipropylene glycol diacrylate, ethylene glycol acrylate, propylene glycol dimethacrylate, and diethylene glycol dimethacrylate, and/or polythiol compounds having two or more thiol groups in a molecule thereof, for example, trimethylolpropane trithioglycolate, trimethylolpropane trithiopropylate, and pentaerythritol tetrathioglycol.

The above compounds may be, if necessary, used alone or as a mixture of two or more. However, in order to impart coatability on an ordinary level to the resin composition, preferably, the resin composition comprises not less than 5% by weight of the prepolymer or oligomer and not more than 95% by weight of the monomer and/or polyol.

In the selection of the monomer, when flexibility is required of the cured product, the amount of the monomer may be reduced to such an extent as will cause no problem of coatability, or alternatively a monofunctional or difunctional acrylate monomer may be used to provide a structure having a relatively low degree of crosslinking. On the other hand, when heat resistance, hardness, solvent resistant and other properties are required of the cured product, preferably, the amount of the monomer may be increased to such an extent as will cause no problem of coatability, or alternatively a tri- or higher functional acrylate monomer may be used to provide a structure having a high degree of crosslinking. A mono- or difunctional monomer may be mixed with a tri- or higher functional monomer to regulate the coatability and the properties of the cured product.

Examples of the monofunctional acrylate monomer include 2-hydroxy acrylate, 2-hexyl acrylate, and phenoxyethyl acrylate. Examples of the difunctional monomer include ethylene glycol diacrylate and 1,6-hexanediol diacrylate, and examples of the tri- or higher functional acrylate monomer include trimethylolpropane triacrylate, pentaerythritol hexaacrylate, and dipentaerythritol hexaacrylate.

Further, in order to regulate properties, such as flexibility and surface hardness, at least one of the prepolymer, the oligomer, and the monomer may be mixed with the following ionizing radiation non-curing resin in an amount of 1 to 70% by weight, preferably 5 to 50% by weight.

Preferred ionizing radiation non-curing resins include thermoplastic resins, such as urethane, cellulosic, polyester, acrylic, butyral, polyvinyl chloride, and polyvinyl acetate resins. Cellulosic, urethane, and butyral resins are particularly preferred from the viewpoint of flexibility.

The ionizing radiation curing resin composition may be coated by various conventional coating methods, for example, roll coating, curtain flow coating, wire bar coating, reverse coating, gravure coating, gravure reverse coating, air knife coating, kiss coating, blade coating, smooth coating, and Komma coating. The coverage is about 0.1 to 100 μm on a dry basis.

In the present invention, the resin constituting the surface protective layer 5 is formed of preferably a two-component curing type resin of a combination of a thermoplastic resin as a main agent and a curing agent or an ionizing radiation curing resin. In the case of the ionizing radiation curing resin, the weather resistance is so good that, in recoating of a stain, after the color is removed with a thinner, recoating can be satisfactorily performed without posing any problem. The two-component curing type resin preferably comprises a resin or an oligomer having an active hydrogen as a main agent and an isocyanate curing agent. The isocyanate may be an aliphatic or aromatic di- or higher functional isocyanate with an aliphatic isocyanate being preferred from the viewpoint of excellent thermal discoloration resistance and weather resistance. Aliphatic isocyanates usable herein include xylene diisocyanate, hexamethylene diisocyanate, and lysine diisocyanate. Among others, hexamethylene diisocyanate is preferred. The use of a curing type resin as the resin for constituting the surface protective layer can prevent the creation of a scratch due to friction at the time of particularly processing, resulting in markedly improved abrasion resistance of the product.

In the present invention, the surface protective layer 5 may be formed on a part of the surface of the recoat layer (this embodiment not shown) without the provision of the protective layer on the whole surface of the recoat layer. When the surface protective layer is formed on a part of the surface of the nonwoven fabric constituting the recoat layer 2, some areas of the surface resin layer are different from the other areas in permeability of a paint at the time of coating of a recoating paint. The amount of permeated recoating paint in some areas can be rendered different from that in the other areas. That is, when the paint is a stain, the depth of coloring can be varied according to the pattern, offering a decorative sheet having excellent design. For example, when the pattern is a woodgrain pattern and a protective layer corresponding to the pattern portion is provided on the nonwoven fabric, coating of a stain results in deeper coloring in the pattern area than in the area not having any pattern. This is best suited for a coniferous tree pattern. On the other hand, in the case of a broadleaf tree, a conduit is provided, and a stain or the like permeates into this portion to result in deep coloring. Therefore, in this case, unlike the coniferous tree pattern, a plate for the surface protective layer is a masking plate, and the surface protective layer is provided on the area not having any pattern.

Figure 5:
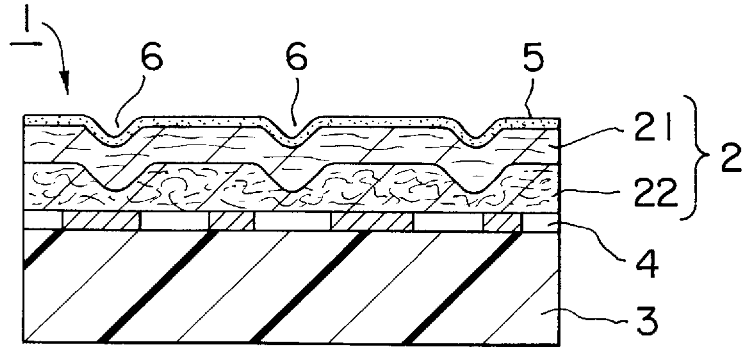
FIG. 5 is a longitudinal sectional view showing a fourth embodiment of the recoatable decorative sheet according to the present invention.

As shown in FIG. 5, the recoatable decorative sheet according to the present invention may comprise a recoat layer 2 having a laminate structure of nonwoven fabrics having different direction of orientation and a surface protective layer 5 provided on the surface of the recoat layer 2. In this case, preferably, the recoat layer 2 is constructed so as for the orientated nonwoven fabric 21 to be laminated on the external surface side, and the surface protective layer 5 is provided on the surface of the oriented nonwoven fabric 21. In the decorative sheet according to the embodiment shown in FIG. 5, the provision of the surface protective layer on the external surface side of the nonwoven fabric in combination with the construction of the recoat layer comprising a laminate of an oriented nonwoven fabric and a non-oriented nonwoven fabric realizes a decorative sheet which is particularly excellent in both abrasion resistance and design. Further, as shown in FIGS. 3 and 5, an irregular pattern 6 may be provided by embossing on the surface of the recoatable decorative sheet 1.

Figure 6:
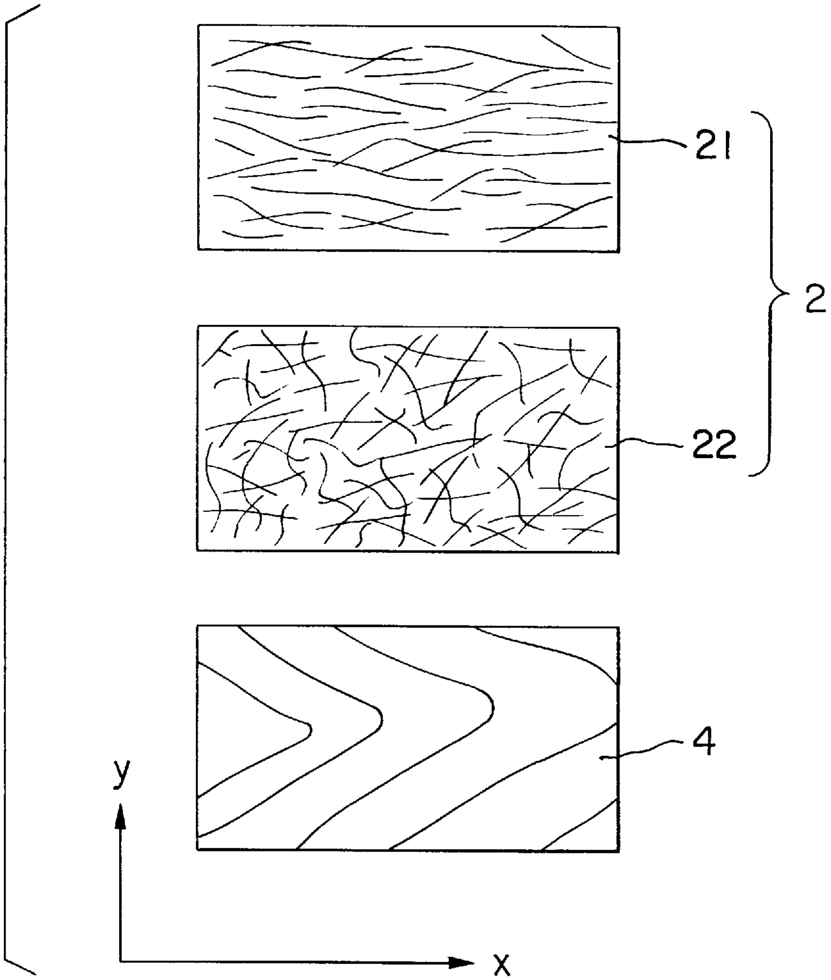
FIG. 6 is a plan view of each layer for explaining a combination of the direction of orientation of a nonwoven fabric with the direction of orientation of a pattern.

In the recoatable decorative sheet 1 according to the present invention, the direction of the pattern in the pattern layer 4 may have a certain correlation with the direction of orientation of the nonwoven fabric constituting the recoat layer 2. For example, as shown in FIG. 6, in the case of provision of a woodgrain pattern in the pattern layer 4, when the direction of the wood grain pattern is as indicated by X, the direction of orientation of the oriented nonwoven fabric 21 is made identical to the direction X of the woodgrain pattern and this oriented nonwoven fabric is laminated on the surface of the pattern layer 4 through the non-oriented nonwoven fabric. Such lamination offers an advantage that, when the woodgrain pattern is viewed through the recoat layer 2 of a nonwoven fabric, since gaps of the oriented nonwoven fabric 21 are arranged in the direction of the orientation, a beautiful view of the underlying woodgrain pattern can be provided. Regarding the non-oriented nonwoven fabric 22, as compared with the case where the direction of orientation is identical to the direction of the woodgrain pattern, the beautiful view of the pattern is somewhat deteriorated. However, the non-oriented nonwoven fabric does not remarkably deteriorate the visibility of the woodgrain pattern as compared with the use of a nonwoven fabric oriented in a direction (a direction indicated by an arrow Y) intersecting the direction of the woodgrain pattern.

According to the recoatable decorative sheet of the present invention, when the resin constituting the substrate sheet 3 or the binder of an ink for forming the pattern layer 4 is a thermoplastic resin, the lamination of the recoat layer 2 of a nonwoven fabric onto the surface of the substrate sheet 3 (or pattern layer 4) can be performed by hot pressing. Alternatively, the nonwoven fabric may be laminated with the aide of an adhesive. In this case, stable bond strength can be provided. The lamination of the nonwoven fabric with the aid of an adhesive may be performed by wet lamination or dry lamination. The adhesive may be suitably selected according to the substrate sheet, the pattern layer, the type of the nonwoven fabric and the like, and quality requirements. For example, curing type adhesives, such as a vinyl acetate emulsion, a vinyl acetate/acrylic ester copolymer emulsion, or an isocyanate of a polyester or a polyether, and adhesives of epoxy resins usable in various curing methods may be suitably used. Further, in the case of a recoat layer 2 having a laminate structure, an nonwoven fabric previously formed as a laminate may be laminated on the surface of the substrate sheet, or alternatively, nonwoven fabrics having different orientation of fibers may be successively laminated on the surface of the substrate sheet.

The recoatable decorative sheet 1 may be applied to a substrate for a decorative material, thereby preparing a recoatable decorative material. The substrate for a decorative material may have desired shape and quality according to the applications of the decorative materials and the like. The substrate for a decorative material may be in the form of any of a sheet, a plate, and a three-dimensional object. Further, the material for the substrate for a decorative material also is not particularly limited. Substrates, for a decorative material, usable herein include, for example, (1) plates or moldings of stainless steel, steel, aluminum, copper and the like, (2) plates or moldings of inorganic materials, such as glass, marble, pottery, gypsum board, asbestos cement board, calcium silicate plate, and GRC (glass fiber-reinforced cement), (3) plates, moldings, sheets, or films of polyester, melamine, polyvinyl chloride, and diallyl phthalate, (4) wood plates or moldings, such as wood, plywood, and particle boards, (5) papers such as thin paper, bleached kraft paper, titanium paper, linter paper, paperboard, and gypsum board; films of plastics, such as polyethylene, polypropylene, polyvinyl chloride, polyvinylidene chloride, polyvinyl alcohol, polyethylene terephthalate, polycarbonate, nylon, polystyrene, ethylene/vinyl acetate copolymer, ethylene/vinyl alcohol copolymer, and ionomer; foils or sheets of metals, such as iron, aluminum, and copper; and composites of the above materials. These substrates for a decorative material may be subjected to surface treatment such as sealing or primer treatment or treatment for improving the adhesion. The decorative sheet 1 may be applied to the substrate for a decorative material by various means, such as bonding with the aid of an adhesive, heat fusing, and dry lamination.

The recoat layer in the recoatable decorative sheet or recoatable decorative material, after assembling into furniture or the like, may be coated with a paint, such as a colorant, by brush coating, spray coating or the like. Colorants usable herein include those commonly used in coloring of usual woods. An example thereof is a solution or dispersion of a dye in water, lacquer, oil varnish, synthetic resin varnish or the like. When such a colorant is coated on the recoatable decorative sheet and the recoatable decorative material, the colorant satisfactorily permeates into the nonwoven fabric constituting the recoat layer located on the surface thereof, resulting in the formation of an even coating having good build without causing sagging or cissing. This coating can be performed as in coloring of wood products.

EXAMPLE 1

A woodgrain pattern layer was printed with an ink comprising a vinyl chloride/vinyl acetate copolymer as a binder by gravure printing on a surface of a 150 $\mu$m-thick polyvinyl chloride sheet containing a plasticizer on a loading level of 23 PHR. Then, an acrylic nonwoven fabric having a basis weight of 25 g/m$^2$ and formed of fibers having a fiber length of 44 mm and a thickness of 1 denier and mainly oriented in the longitudinal direction (the longitudinal direction of a nonwoven fabric formed as a continuous sheet) was put and laminated onto the surface of the pattern layer under conditions of temperature 150° C. and pressure 30 kg/cm$^2$ to prepare a recoatable decorative sheet according to the present invention. The surface of the recoatable decorative sheet thus obtained was brush-coated with a colorant (a wood stain manufactured by Behr, U.S.A.) until surface gloss was provided. The brush coating could provide a surface coat layer having excellent build without cissing or sagging.

EXAMPLE 2

A woodgrain pattern layer was printed with an ink comprising a vinyl chloride/vinyl acetate copolymer as a binder by gravure printing on a surface of a 150 $\mu$m-thick polyvinyl chloride sheet containing a plasticizer on a loading level of 25 PHR. Then, a nonwoven fabric prepared by laminating a nonwoven fabric A having a thickness of 12 g/m$^2$ and formed of fibers (a blend of a polyester fiber having a fiber length of 38 mm and a fiber thickness of 1.5 denier and an acrylic fiber having a fiber length of 44 mm and a fiber thickness of 1.5 denier in a ratio of 8:2) mainly oriented in the longitudinal direction onto a nonwoven fabric B having a thickness of 13 g/m$^2$ and formed of randomly mingled fibers (a blend of the above polyester fiber and the above acrylic fiber in a ratio of 2:8) by calendering at a temperature of 160° to 200° C. was laminated onto the pattern layer. In this case, the nonwoven fabric was put on the pattern layer so as for the nonwoven fabric B to come into contact with the pattern layer, the longitudinal direction of the fibers constituting the nonwoven fabric A was made identical to the woodgrain direction of the woodgrain pattern in the pattern layer, and lamination was performed under conditions of temperature 150° C. and pressure 30 kg/cm$^2$ to prepare a recoatable decorative sheet. The surface of the recoat layer in the decorative sheet thus obtained was coated with a stain, until gloss was provided, in the same manner as in Example 1. As a result, the brush coating could provide a surface coat layer having excellent build without cissing or sagging. Further, since the longitudinal direction of oriented fibers constituting the nonwoven fabric in the recoat layer was made identical to the woodgrain direction of the woodgrain pattern, the decorative sheet had a good design which highly resembles a natural wood.

EXAMPLE 3

An isocyanate curing type vinyl chloride/vinyl acetate copolymer was coated by gravure coating at a coverage of 3 to 5 g/m$^2$ on the surface of the nonwoven fabric in the recoatable decorative sheet prepared in Example 2, using a solid plate, thereby forming a surface resin layer. Thereafter, the resin layer was cured at 40° C. for 2 hr. Thus, a decorative sheet was prepared.

EXAMPLE 4

A 150 $\mu$m-thick polyvinyl chloride sheet containing a plasticizer on a loading level of 23 PHR was provided as a substrate sheet, and a woodgrain pattern layer was printed with an ink comprising a vinyl chloride/vinyl acetate copolymer as a binder by gravure printing on the substrate. Subsequently, an acryl/polyester nonwoven fabric having a basis weight of 25 g/m$^2$ was hot-laminated onto the surface of the pattern layer to provide a recoat layer. The lamination was conducted under temperature 170° C. and pressure 30 kg/cm$^2$. An isocyanate curing type vinyl chloride/vinyl acetate copolymer was coated by gravure coating at a coverage of 3 to 5 g/m$^2$ on the surface of the nonwoven fabric using a solid plate, thereby forming a surface resin layer. Thereafter, the resin layer was cured at 40° C. for 2 hr. Thus, a decorative sheet was prepared. This decorative sheet was laminated onto a substrate (aluminum, plastic extrudate, MDF, steel plate) by lapping to prepare a decorative material. In this case, the lapping could be successfully performed without creating any scratch on the surface of the decorative material. An aqueous stain and an oil stain (both manufactured by Behr, U.S.A.) were brush-coated on the surface of the decorative material thus obtained. The brush coating could be successfully performed without causing cissing, sagging, and fuzzing. Further, no scratch was created at the time of the lamination of the decorative sheet by lapping.

EXAMPLE 5

A decorative sheet and a decorative material were prepared in the same manner as in Example 4, except that a plate having the same pattern as that in the pattern layer was used, instead of the solid plate in Example 4, and a surface resin layer conformed to the pattern was provided. A stain was coated on the decorative material thus obtained. The area provided with a protective layer (area having a woodgrain pattern) had poor permeability to the stain, creating a difference in permeability between the area having the protective layer and the area not having the protective layer. Thus, a design could be prepared which better resembled a natural wood as compared with the decorative material of Example 4.

EXAMPLE 6

A woodgrain pattern layer was printed with an ink comprising a blend of an acrylic resin and a vinyl chloride/vinyl acetate copolymer as a binder by gravure printing on a surface of a 130 $\mu$m-thick polyvinyl chloride sheet containing a plasticizer on a loading level of 18 PHR. Then, an acryl/polyester nonwoven fabric having a basis weight of 25 g/m$^2$ and formed of fibers having a fiber length of 44 mm and a thickness of 1.5 denier and mainly oriented in the longitudinal direction (the longitudinal direction of a nonwoven fabric formed as a continuous sheet) was hot-laminated onto the surface of the pattern layer to form a recoat layer. The lamination was performed under conditions of temperature 150° C. and pressure 60 kg/cm$_2$. Further, an ionizing radiation curing type resin composition comprising an oligoacrylate, a monomer, an extender pigment having a particle diameter of 4 to 5 $\mu$m, an extender pigment having a particle diameter of not less than 10 $\mu$m, a high-molecular weight copolymer having a reactive group (a dispersant), and a release accelerator was coated by gravure printing at a coverage of 2 to 3 g/m$^2$ using a solid plate to form a surface resin layer. Thereafter, the surface resin layer was then irradiated with an electron beam under conditions of 165 kev and 3 Mrad to prepare a decorative sheet. This decorative sheet was laminated onto a substrate (aluminum, plastic extrudate, MDF, steel plate) by lapping to prepare a decorative material. In this case, the lapping could be successfully performed without creating any flaw and fluff. An aqueous stain and an oil stain (both manufactured by Behr, U.S.A.) were brush-coated on the surface of the decorative material thus obtained. The brush coating could be successfully performed without cissing, sagging, and fluff. Further, no flaw was created in the lamination of the decorative sheet by lapping.

Further, after the color was removed with a thinner, recoating could be performed without any problem.

Comparative Example 1

A decorative sheet was prepared in the same manner as in Example 1, except that a resin layer prepared by coating a solvent type varnish, composed mainly of a vinyl chloride/vinyl acetate copolymer, on the surface of a pattern layer provided on the polyvinyl chloride sheet and drying the coating was used instead of a recoat layer formed of the nonwoven fabric in Example 1. A stain agent was coated on the resin layer of the decorative sheet until surface gloss was provided in the same manner as the examples. Since, however, the resin layer had no permeability to the stain agent, the stain agent sagged from the surface of the sheet, making it impossible to form a surface coat having good build.

Comparative Example 2

A pattern was printed on a colored vinyl chloride sheet, and a clear vinyl chloride sheet was laminated onto the printed face to prepare a decorative sheet. A stain agent was coated on the decorative coat. Since, however, the vinyl chloride sheet had no permeability to the stain agent, the stain agent sagged from the surface of the sheet, making it impossible to form a surface coat having good build.

Comparative Example 3

A stain was coated on a decorative material comprising a foamed plastic substrate having thereon a woodgrain pattern, and the color was removed with a thinner in order to conduct recoating. However, the woodgrain pattern, together with the color, was removed, unfavorably resulting in exposed substrate. This demonstrates that the decorative material had no solvent resistance.

Comparative Example 4

An oil stain was coated as a recoat layer on a decorative paper with an overprint layer, for recoating, being provided thereon (a decorative paper comprising a coat paper, having a basis weight of 30 g/m$^2$, bearing an acrylic polyol/cellulose resin layer as a recoat layer). However, the adhesion of the oil stain to the decorative paper was poor, and the coating was unfavorably peeled off by a tape.

Reference Example 1

For reference, a wood stain agent (Bear, U.S.A) was brush-coated as a colorant on a veneer using a natural wood until surface gloss was provided in the same manner as in Example 1. In this case, a surface coat layer having good build could be formed without causing cissing, sagging and the like. However, marked discoloration of the stain was observed in a weathering test [an accelerated weathering test (irradiation time: 2000 hr) using a sunshine weatherometer]. The same weathering test was conducted for the products prepared in the examples and the comparative examples. As a result, none of the products prepared in the examples and the comparative examples exhibited no significant discoloration.

As described above, in the recoatable decorative sheet and the recoatable decorative material according to the present invention, by virtue of a construction having a recoat layer, formed of a nonwoven fabric on the surface thereof, a recoating paint, such as a stain, permeates into the interior of the recoat layer, enabling an even surface having excellent build to be formed without sagging or cissing at the time of coating. Further, coating of a recoating paint on wood products results in the formation of a surface having very similar build and, at the same time, excellent durability. Further, when a recoating paint is coated, since it permeates into gaps in the interior of the nonwoven fabric in the recoat layer, the adhesion of the recoating paint to the decorative sheet is excellent. When a stain is coated on a veneer of a natural wood, the coating has excellent build but is poor in resistance to moisture absorption and desorption, temperature change, and light, whereas in the present invention, a stain or the like may be coated in the same manner as the coating of the stain on the natural wood and the resultant coating has excellent weather resistance.

Further, a decorative sheet having a surface protective layer formed of an ionizing radiation-cured resin (invention as claimed in claim 8) is recoatable. This is because a paint or a stain, which has been previously coated, can be fully removed with toluene or thinner without dissolving a nonwoven fabric and a pattern layer, by virtue of excellent solvent resistance of the ionizing radiation-cured resin constituting the surface protective layer.

I claim:

1. A recoatable decorative sheet comprising: a recoat layer provided on a surface thereof, said recoat layer comprising a laminate of an oriented nonwoven fabric and a nonoriented nonwoven fabric.

2. The recoatable decorative sheet according to claim 1, wherein the nonwoven fabric has a basis weight of 10 to 30 g/m$^2$.

3. The recoatable decorative sheet according to claim 1, wherein the nonwoven fabric comprises a thermoplastic resin.

4. The recoatable decorative sheet according to claim 1, wherein the nonwoven fabric has a surface protective layer.

5. The recoatable decorative sheet according to claim 4, wherein the surface protective layer has been formed using a two-component curing resin.

6. The recoatable decorative sheet according to claim 4, wherein the surface protective layer is formed of an ionizing radiation curing resin.

7. The recoatable decorative sheet according to claim 1, wherein a pattern layer is provided as a layer underlying the nonwoven fabric.

8. The recoatable decorative sheet according to claim 7, wherein the pattern in the pattern layer is a woodgrain pattern and the direction of the wood grain pattern is identical to the direction of orientation of fibers constituting the nonwoven fabric.

9. A recoatable decorative material, comprising: a substrate for a decorative material; and a recoatable decorative sheet according to claim 1, the decorative sheet being laminated on the substrate for a decorative material.

* * * * *